United States Patent [19]

Downs

[11] 3,720,812
[45] March 13, 1973

[54] METHOD AND APPARATUS FOR DETECTING AND COUNTING OBJECTS BY TRANSLATION OF VIDEO SIGNALS

[75] Inventor: Raymond F. Downs, Pleasanton, Calif.

[73] Assignee: DHM Research & Development Corporation, San Francisco, Calif.

[22] Filed: April 9, 1971

[21] Appl. No.: 132,659

[52] U.S. Cl. .........235/92 PC, 235/92 R, 235/92 DN, 235/92 MP
[51] Int. Cl. ............................................G06m 11/04
[58] Field of Search .....................235/92 PC, 92 MP

[56] References Cited

UNITED STATES PATENTS

| | | | |
|---|---|---|---|
| 2,791,695 | 5/1957 | Bareford | 235/92 PC |
| 3,214,574 | 10/1965 | Landsman | 235/92 PC |
| 3,609,307 | 9/1971 | Totsuka | 235/92 R |

*Primary Examiner*—Maynard R. Wilbur
*Assistant Examiner*—Robert F. Gnuse
*Attorney*—Fryer, Tjensvold, Feix, Phillips & Lempio

[57] ABSTRACT

Optically distinguishable objects in a specimen area, such as bacteria colonies cultured on a petri dish, are scanned by a vidicon tube which transmits a video signal to a data processing circuit for detecting and counting objects including overlapping objects. Horizontal and vertical sweeps of the tube are controlled by the video signal processing circuit clock at a rate slower than television sweep frequencies to provide broad bandwidth and to enable the use of low cost components in the data processing circuit. The circuit identifies the center line of each object encountered in a scan by counting clock pulses at one half the normal rate between the video signal transitions which demark opposite edges of the object and temporarily stores the centerline position. Signals from subsequent scans identifying an object intersected by the same centerline are erased from the storage until a subsequent scan fails to detect an object at the centerline position at which time the data is erased and an additional object count is added to the accumulated total. The count for each specimen is displayed visually and may be recorded by a printer together with a specimen identification number. Provisions are present for selecting the minimum sized object to be counted, for making multiple counts of the specimen at the same or different scan orientations to increase accuracy and sweep speeds of the tube may be temporarily restored to television frequencies to provide for a display of the specimen on a TV moniter. The apparatus has provisions for avoiding false counts from objects outside the area of interest and may be coupled to a general purpose computer or compact special purpose computer components for further analysis of object parameters, such as size, growth and the like.

13 Claims, 9 Drawing Figures

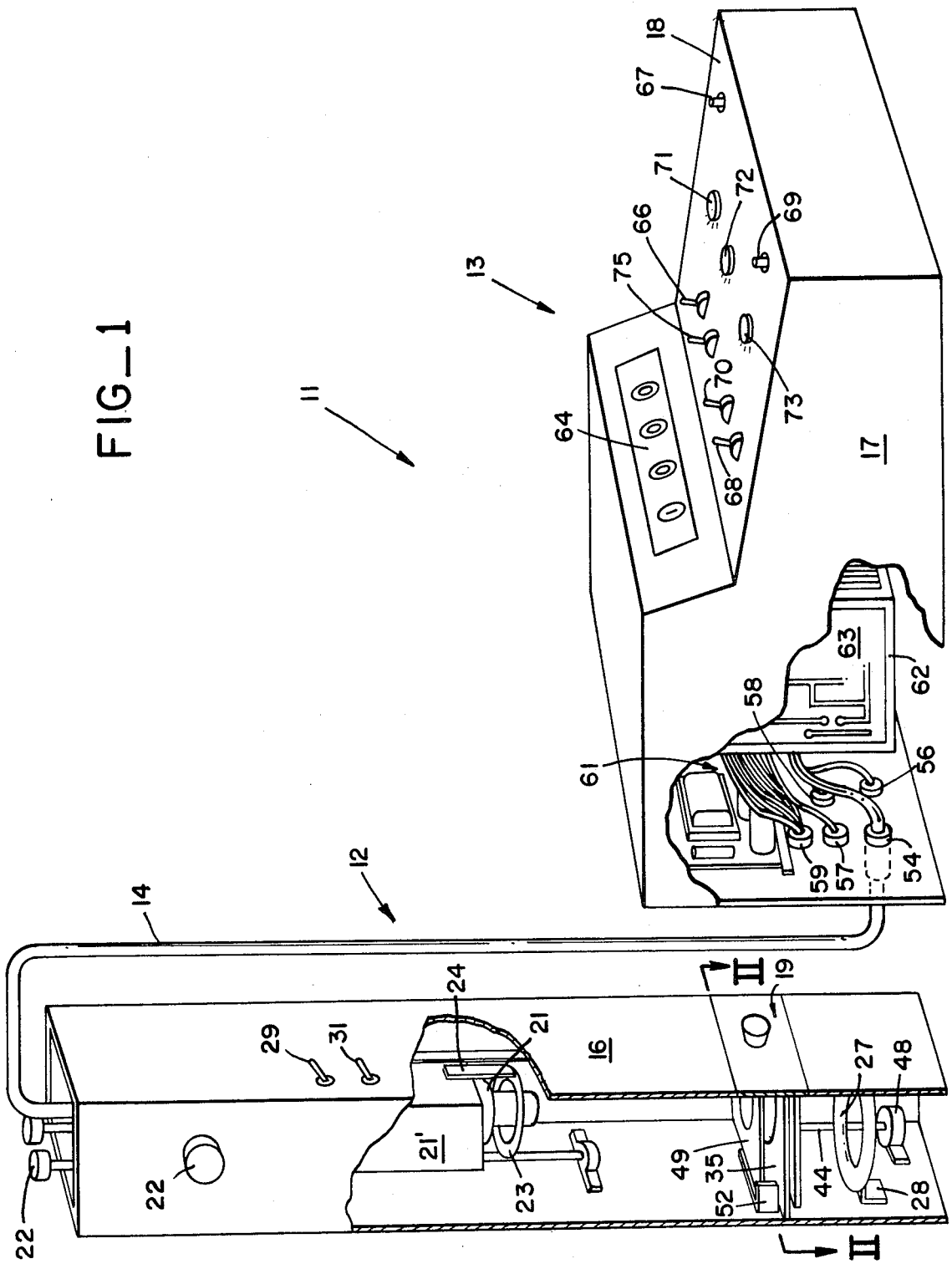

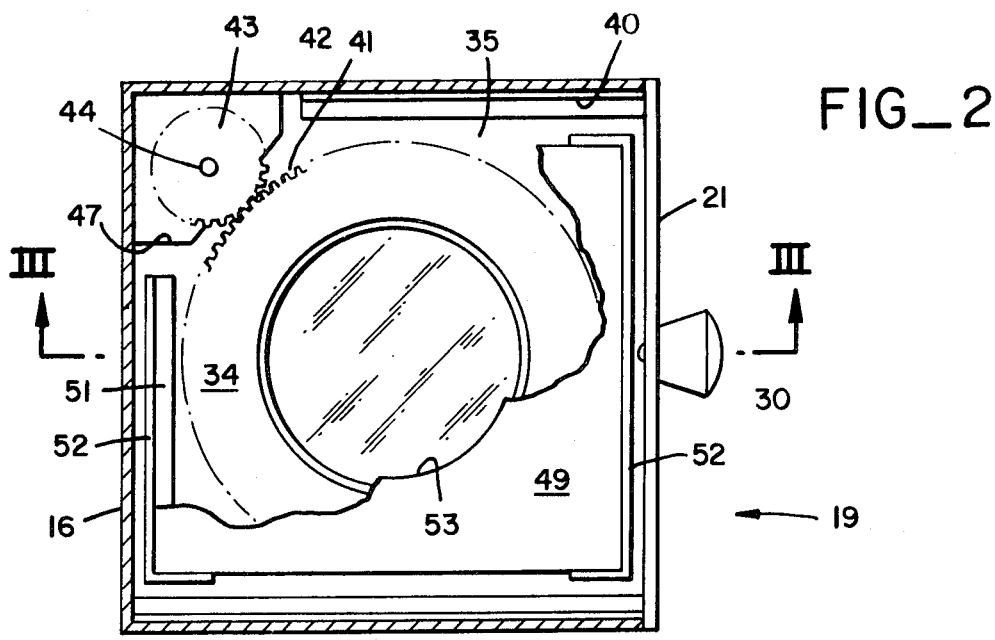
FIG_2
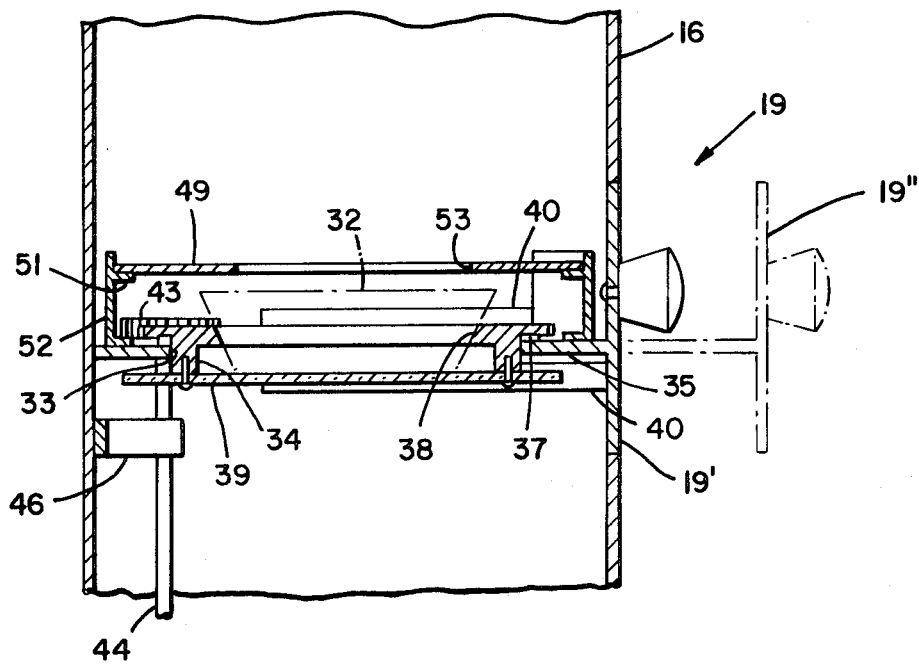
FIG_3
INVENTOR
RAYMOND F. DOWNS

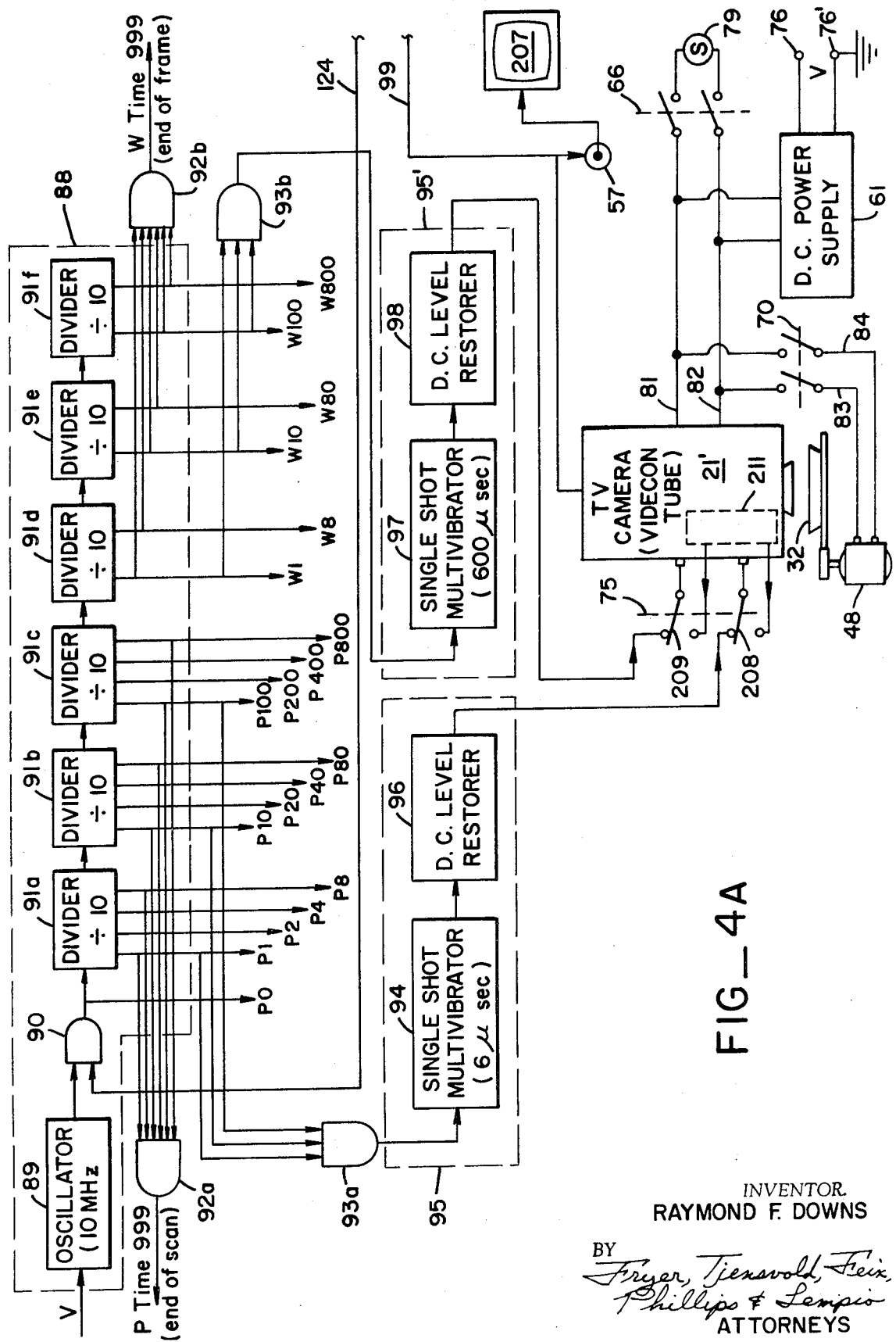
FIG_4A
INVENTOR.
RAYMOND F. DOWNS

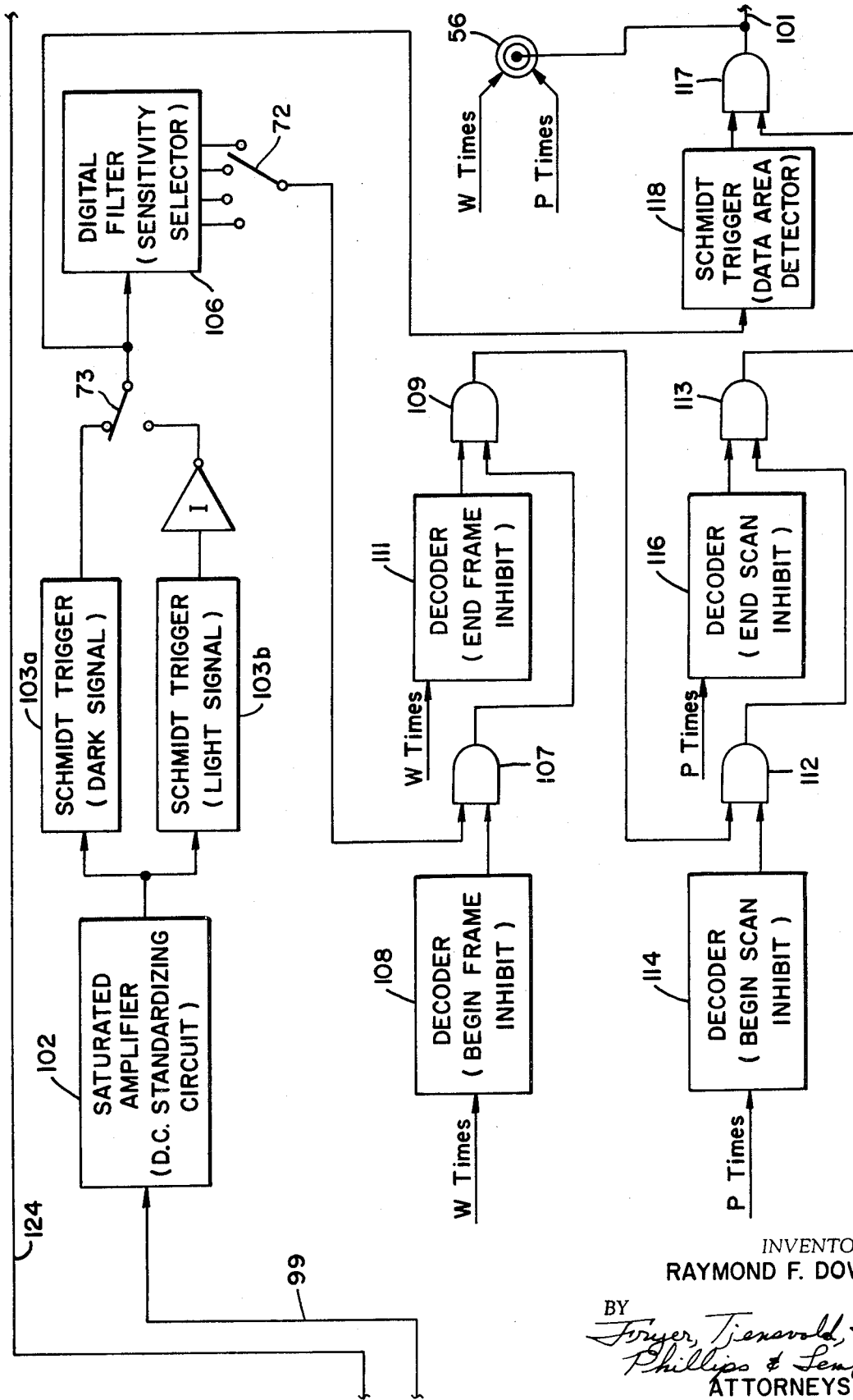
FIG_4B

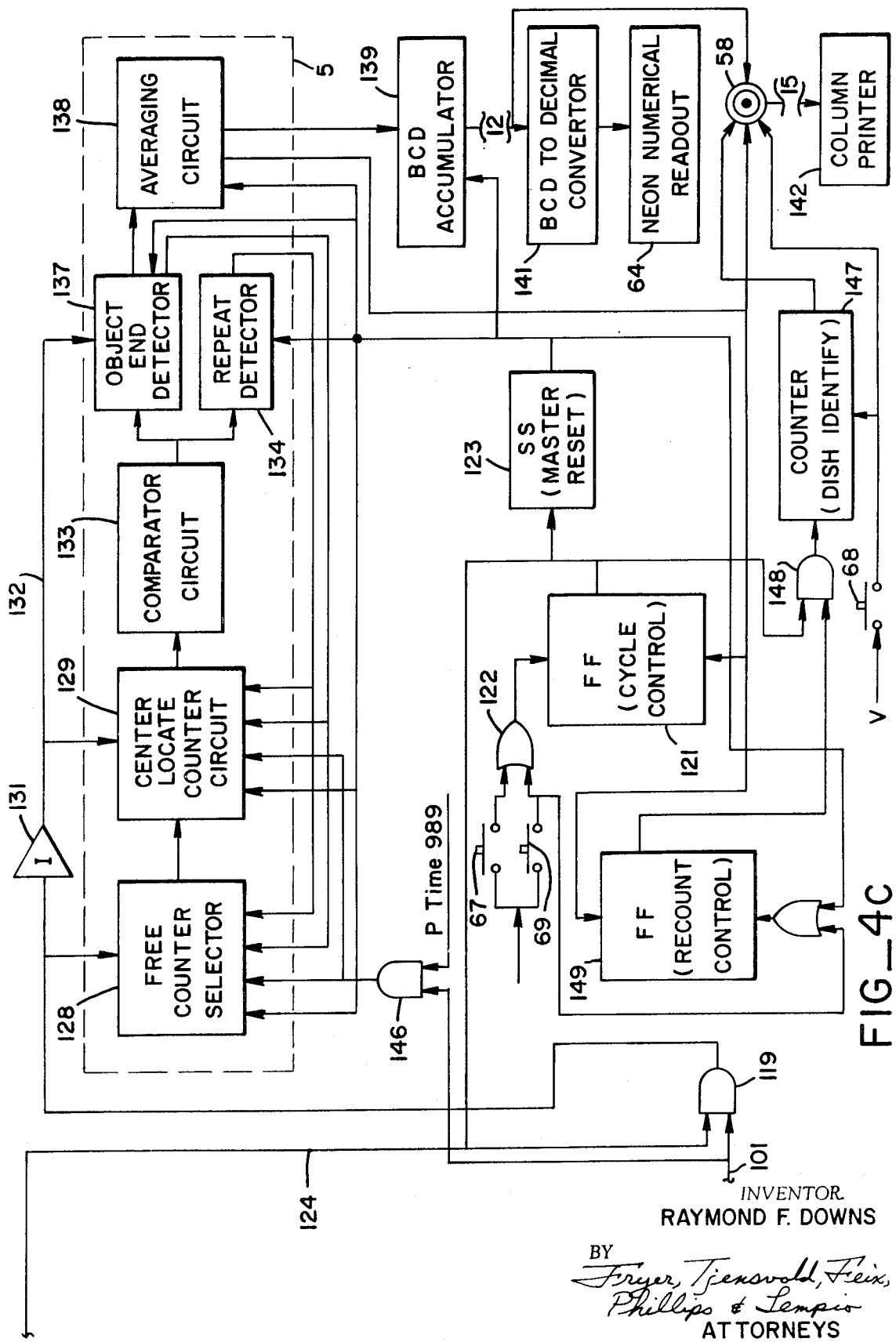

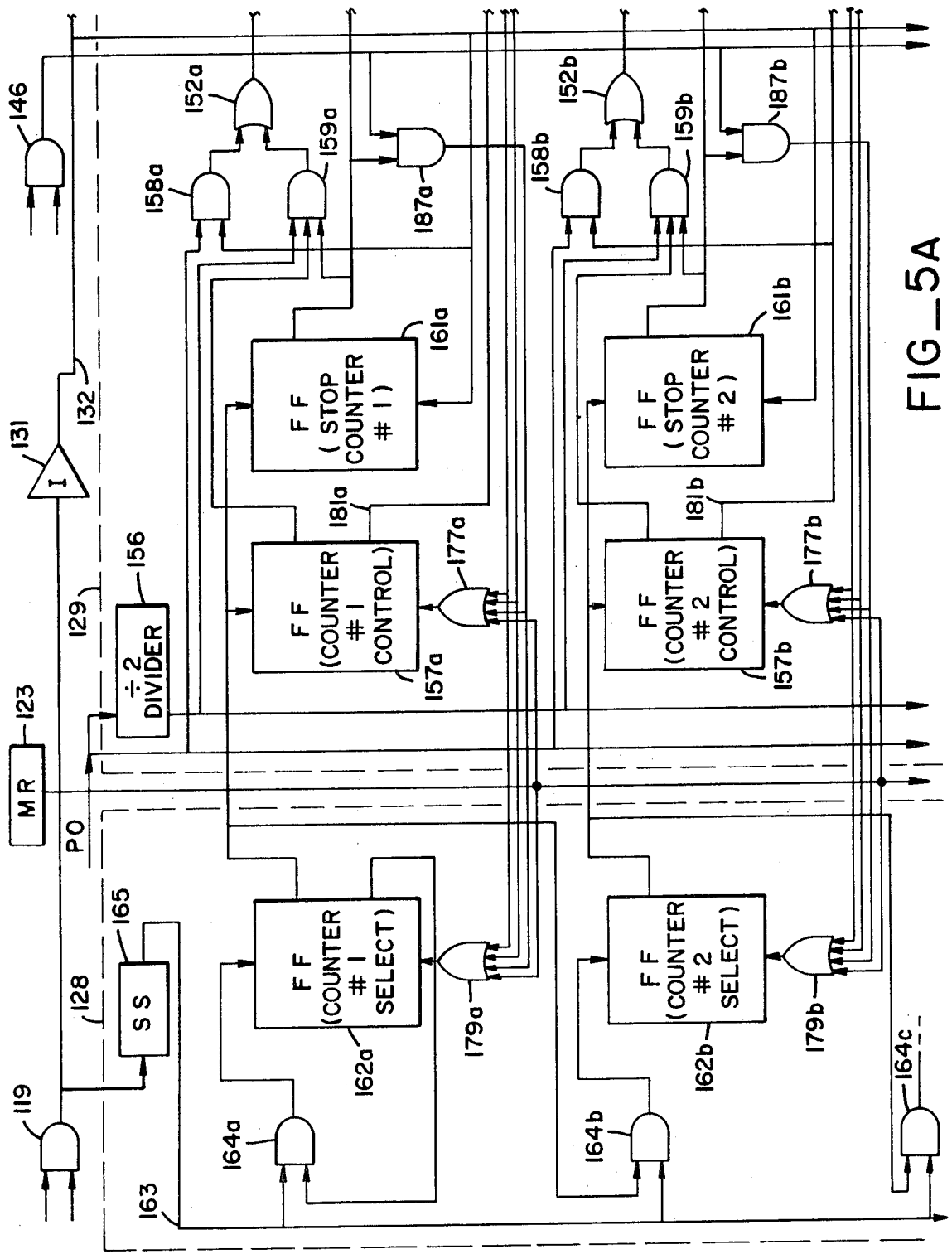

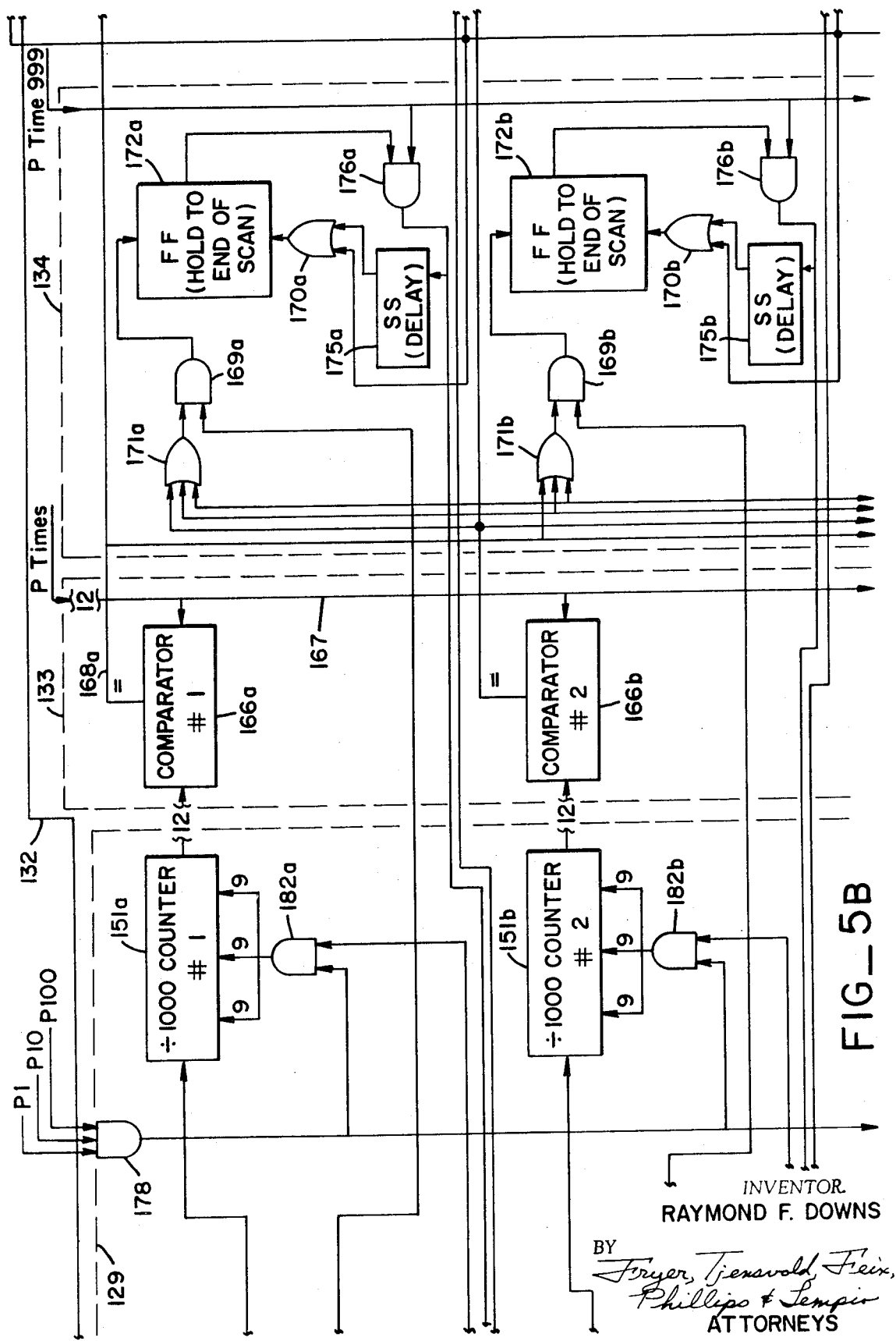
FIG_5B

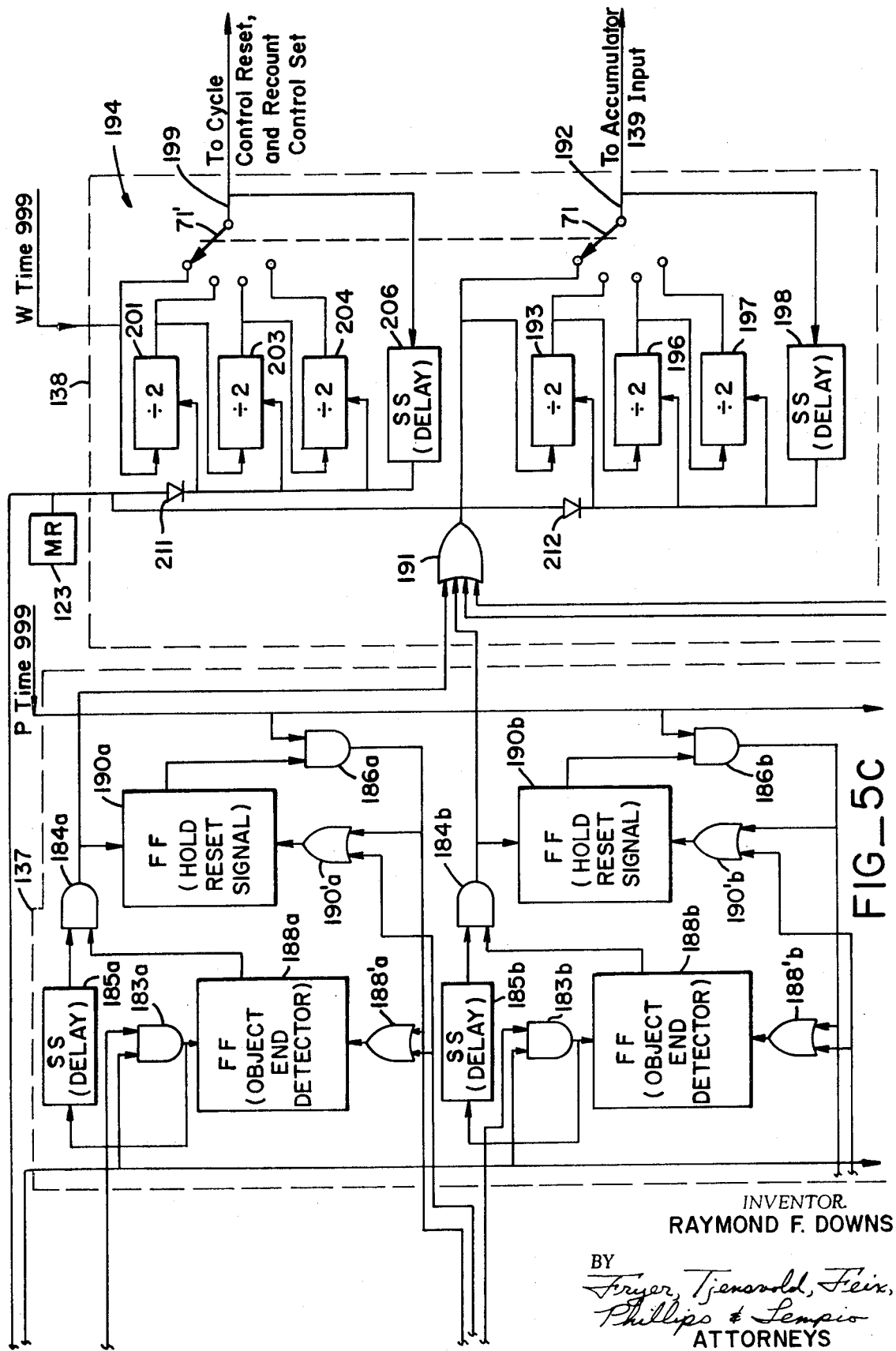
FIG_5c

METHOD AND APPARATUS FOR DETECTING AND COUNTING OBJECTS BY TRANSLATION OF VIDEO SIGNALS

Background of the Invention

This invention relates to apparatus and techniques for scanning predetermined areas to detect and count optically distinguishable objects or images therein.

In many different medical, technical and industrial contexts, it is necessary to perform counts of visually distinct objects or areas within a selected field of view. In microbiological investigations, for example, it is often necessary to count the number of distinct bacteria colonies on a petri dish or the like which has been coated with a culture medium. This may be necessary for medical diagnostic purposes as well as in research studies and is performed as a routine check in certain water purification installations and sewage treatment facilities. This invention was initially developed primarily for bacteria colony counting purposes and will be herein described with reference to this particular use, it being apparent that the invention is equally applicable to diverse other object detecting and counting operations. Examples of such other operations include blood cell counts, star counts of astronomical photographs, analysis of photographs which have been treated to emphasize particular images to be counted, counting of pollen grains or pollutant accumulations on microscope slides and a variety of other essentially similar operations.

Bacteria colony counts have traditionally been performed manually with the aid of a microscope. This is an inherently tedious and slow process and these factors have affected both the accuracy and extent of use of such counts. A typical single dish count requires from one to three minutes and accuracy is very dependent on the alertness and subjective judgement of the person performing the count.

These problems can be avoided by electronically scanning the specimen area and by using digital data processing techniques to obtain the desired count. Systems have heretofore been devised for this purpose in which an optical scanner of the flying spot form or of the vidicon tube type is coupled to a general purpose digital computer appropriately programmed to provide the desired data. Because of the cost and complexity of these systems and the need for highly skilled operators, such systems have been limited to large research laboratories and the like and are not, as a practical matter, available to many of the potential users of such equipment who do not have access to costly computer facilities. A need exists for a compact relatively inexpensive instrument of this kind which can deliver rapid accurate counts and which can be operated by technicians who may not have extensive scientific training.

Summary of the Invention

This invention provides a method and a simplified, compact and relatively inexpensive apparatus for scanning a predetermined region to count the number of optically distinct objects or areas therein including overlapping objects. In a preferred form of the invention, scanning is performed by a vidicon tube having a slowed sweep speed to provide for processing of the video signal with low cost circuit components. The sweep speed is determined by an oscillator which also provides clock pulses to counters in the signal processing circuit during each scan. When the video signal indicates a transition between relatively light and dark regions in the field of view, a count at half rate commences and is terminated upon the later reverse transition thereby storing a centerline position for the scanned object. Object position signals from each succeeding scan are erased if the position includes the previously stored centerline until a scan passes through the centerline position without detecting an object at that point. The centerline position is then erased and an object count is added to the accumulated total. Means may be provided for eliminating counts from objects outside an area of interest or from spurious signals while the scan is outside such area.

In the preferred form of the invention, visual display of the accumulated count is provided in addition to a printer output for recording the count of each of a series of specimens together with a specimen identifying number and means are provided to re-count any particular specimens without disrupting the identification number sequence. Also, in a preferred form, controls provide for selecting the minimum sized object to be counted and for producing a visual display of a specimen on a TV monitor. To enhance accuracy, means may be provided to compare repeated scans of each specimen including multiple scans wherein the orientation of the specimen relative to the scan has been shifted angularly for each count. Still other advantageous innovations are provided and will be apparent from the subsequent description of a preferred embodiment.

Accordingly, it is an object of this invention to facilitate the counting of optically identifiable objects or images in a predetermined area.

It is a further object of the invention to provide a compact simplified and relatively inexpensive electronic instrument for accurately counting objects.

It is still another object of this invention to provide a scanning and counting system capable of efficiently detecting and separately counting overlapping objects in a field of view without excessive circuit complications.

The invention, together with further objects and advantages thereof, will be better understood by reference to the following description of a preferred embodiment in conjunction with the accompanying drawings.

Brief Description of the Drawings

In the accompanying drawings:

FIG. 1 is a perspective view of apparatus embodying the invention including a vidicon tube camera and support means, specimen holding and manipulating means and a signal processing circuit housing, the structure being broken out in part to expose interior components, FIG. 2 is a plan section view taken along line II—II of FIG. 1 illustrating details of the specimen holding mechanism, FIG. 3 is an elevation section view taken along line III—III of FIG. 2 further clarifying the structure of the specimen holding mechanism, FIG. 4A is a block circuit diagram showing controls for the camera and specimen holder of FIG. 1 and an oscillator and timing pulse source, FIG. 4B is a continuation of FIG. 4A showing circuits for processing the analog video signal from the camera into a form adaptable to the subsequent digital circuits and including means for supressing signals from edge areas of the region scanned by the vidicon tube, FIG. 4C is a continuation of FIG. 4B showing the digital circuits for identifying and counting objects together with means for accumulating, recording and displaying the object count, and FIGS. 5A to 5C, which may be juxtaposed in sequential side by side relationship, show certain portions of the digital circuits of FIG. 4C in greater detail.

Description of a Preferred Embodiment Referring now to FIG. 1 of the drawing, object counting apparatus 11 in accordance with the invention is shown in a form particularly adapted for automating the counting of bacteria colonies on petri dishes, it being apparent that the apparatus is also useful for a variety of other counting operations. To provide for convenient handling and flexibility of placement, this embodiment of the counting apparatus 11 is formed of two distinct assemblies, a scanner unit 12 and a video signal translator and control unit 13, which are connected through a multi-conductor cable 14. Owing to the general shape and relative placement of internal components to be herein described scanner unit 12 preferably has a long upright housing 16 of square cross section while translator and control unit 13 has a rectangular housing 17 suitable for disposition on a table top or the like with a stepped upper forward surface which defines a control console panel 18.

A slidable petri dish holder drawer 19 is situated within the lower portion of scanner unit housing 16 and a television camera 21' of the form having a vidicon tube 21 is situated in the upper portion of the housing in position to view the central portion of the upper surface of the petri dish holder drawer 19. While the camera 21' may be fixed in position for standardized operations, greater flexibility is provided if manual controls 22 are provided for adjusting the position of the camera vertically and in both horizontal directions, suitable detailed constructions for such positioning means being known to the art. Multi-conductor cable 14 enters the top of scanner unit housing 16 to provide for connection of the camera 21' with the translator and control unit 13.

Accurate scanning of the petri dish by vidicon tube 21 requires controlled illumination of drawer 19 with light sources so placed to provide good contrast without introducing glare into the image. In most petri dish counting operations, it is preferable to illuminate the dish from a source at the same side of drawer 19 as the vidicon tube and for this purpose a first light source comprised of an annular fluorescent light 23 is disposed within scanner unit housing 16 in coaxial relationship to the optical axis of the tube 21. Light source 23 may be secured to the camera 21' itself by suitable brackets 24. In certain other object counting operations, it may be preferable to utilize a light source situated on the opposite side of the specimen from tube 21 so that the tube image is formed by light transmitted through the specimen. For this purpose an alternate annular fluorescent light source 27 may be secured within scanner unit housing 16 below drawer 19 by suitable brackets 28, the source 27 being again coaxial with respect to the optical axis of tube 21. Switches 29 and 31 are provided on the front surface of housing 16 for selectively controlling the light sources 23 and 27 respectively.

Specimen holder drawer 19, shown in greater detail in FIGS. 2 and 3, performs several functions in addition to that of supporting a petri dish 32. The drawer 19 includes an upright front panel 19' which fits into a rectangular opening in the forward face of scanner unit housing 16 and which can be drawn outward therefrom, as indicated by dashed outline 19'', by means of a suitable knob 30 which is secured to the panel. An essentially rectangular plate 35 extends from the central portion of the inner surface of panel 19' to form a slidable transverse partition within scanner unit housing 16. To support the drawer 19, opposite edges of plate 35 are received between vertically spaced pairs of guide brackets 40 extending along the inner sidewalls of housing 16.

Plate 35 has a large circular opening 33 at the center in which a petri dish holder cylinder 34 is received. Holder 34 has a flange 36 which overlaps plate 35 and suitable needle bearings 37 or the like are disposed therebetween to provide for easy rotation of the specimen holder cylinder relative to plate 35. Specimen holder cylinder 34 has a circular opening 38 into which the lower portion of the petri dishes 32 may be received, the surfaces defining the opening being sloped to conform with the configuration of the dishes. To aid in supporting the petri dish 32 and to provide for the illumination from below as hereinbefore described, the lower end of specimen holder cylinder 34 is closed by a translucent plate 39 formed of frosted glass or the like. Accordingly, each petri dish 32 containing bacteria colonies to be counted may be emplaced in position for scanning by opening drawer 19 and disposing the dish in opening 38 of specimen holder cylinder 34 and then restoring the drawer to its closed position at which the dish is situated in coaxial relationship to the optical axis of the vidicon tube 21 of FIG. 1.

As will hereinafter be discussed in more detail in connection with the data processing circuits of the invention, accuracy of the count may be enhanced under certain circumstances by making a plurality of object counts of the same specimen wherein the specimen is rotated relative to the optical axis of tube 21 between each count and wherein the largest count obtained is selected as the most accurate. While such rotation of the specimen could be performed by opening drawer 19 and turning the specimen manually, this example of the invention includes powered mechanism for this purpose. As best shown in FIGS. 2 and 3, flange 36 of specimen holder cylinder 34 is provided with gear teeth 41 which engage with teeth 42 of a drive gear 43 when drawer 19 is pushed fully into scanner unit housing 16. Drive gear 43 is secured to the upper end of a drive shaft 44 journalled to the housing 16 by suitable bearing brackets 46 and to avoid interference between the drawer 19 and the drive shaft, the appropriate corner 47 of plate 35 is cut away. As best shown in FIG. 1, drive shaft 44 extends downwardly to a stepping motor 48 secured to housing 16 below light source 27. Stepping motor 48 is of the form which turns a predetermined angular amount upon being energized and then stops until a subsequent energization, means for controlling the motor being hereinafter described. Typically, the motor 48 is arranged to rotate specimen holder 34 an angular distance of 45° upon each energization.

In object counting systems of this general type, inaccuracies can frequently be introduced as a result of irregularities at the edge of the specimen area to be examined or as a result of spurious signals which arise when the scan is away from the area of interest. An object which overlaps the edge of the specimen area for example may not be easily distinguishable from adjacent opaque areas. As will hereinafter be described, edge of specimen errors are reduced by electronic circuitry which acts in conjunction with a mask 49, best seen in FIGS. 2 and 3. Mask 49 is a dark opaque square plate shaped to fit within a shelf 51 of mask retainer members 52 which are secured to the upper surface of drawer plate 35 near the forward and rearward edges thereof, the rear retainer 52' being proportioned to avoid interference with drive gear 43. Mask 49 has a central opening 53 which sharply defines the area of dish 32 that is visible to the vidicon tube 21 of FIG. 1. Mask 49 may readily be removed when drawer 19 is opened to enable handling of the petri dishes 32 and may readily be replaced with other masks defining greater or lesser areas of the dish as the specimen area or having different surface coloration to aid in providing contrast for objects lying near the edge of the specimen area.

The above described components of scanner unit 12 enable petri dishes to be emplaced and suitably illuminated for systematic scanning by vidicon tube 21 to produce a video signal which varies in amplitude as a function of the intensity of light reflected from the dish, or transmitted therethrough, at successive points along the scanning raster. Circuits for controlling the scanning action of vidicon tube 21 and for analyzing the video signal output thereof to detect and count bacteria colonies on the petri dish are contained within the video translator and control unit 13.

Translator unit 13 has a plug connector 54 at the back of housing 17 to which the cable 14 from scanning unit 12 connects and has additional plug connectors 56, 57, 58 and 59 for optionally coupling the unit to supplementary equipment such as a column printer, a general purpose computer or special purpose computer elements as will hereinafter be discussed in more detail. Translator unit 13 further contains a suitable DC power supply 61 for developing the predetermined DC voltages necessary for operation of the various circuit elements and further includes an internal rack 62 for retaining printed circuit boards 63 which form the signal processing circuit to be hereinafter described.

A neon numerical readout 64 of the kind providing a visual display of an accumulated count is disposed above console surface 18. Operator's control switches situated on console panel 18 in this embodiment of the invention include an On-Off switch 66 for activating power supply 61 and other components of the invention, a push button Read switch 67 for initiating an object count, a Printer Start switch 68 for activating a column printer to record the counts of a series of specimens together with a dish identifying number for each, a Recount switch 69 for repeating a count of a particular specimen without disrupting the identifying number sequence where a column printer is being used, a dish rotation motor switch 70, a count's Averaging switch 71 for selecting the number of counts to be made of each individual specimen, a Sensitivity Selector switch 72 for selecting the minimum sized object to be included in the count, a light or dark Signal Selector switch 73, for determining whether the system is to count objects which are darker than the background or lighter than the background, and a TV monitor switch 75. The functions of the several control switches will be hereinafter described in greater detail together with the description of circuitry by which the switches effect the several desired control functions.

Considering now the electrical circuits of the above described apparatus, FIGS. 4A, 4B and 4C are components of a single block diagram any may be juxtaposed in sequential side by side relationship to illustrate salient circuit components of the system and the interrelationships therebetween.

Referring initially to FIG. 4A in particular, DC power supply 61 has terminals 76 and 76' across which DC operating voltage for the electrical circuit is produced when the On-Off switch 66 is closed. On-Off switch 66 serves to couple the power supply 61 to any suitable standard source 79 of AC supply voltage. To avoid undesirable complication in FIG. 4A and the other circuit diagrams, the connections between DC voltage terminals 76 and 76' and the various circuit components are not illustrated except in connection with control switches wherein such connection is indicated by an input arrow and the letter V. Through conductors 81 and 82, closing of On-Off switch 66 also connects AC power source 79 to camera 21' to supply operating power thereto. Conductors 83 and 84 connect AC power source 79 to stepping motor 48 through the rotate specimen switch 70 to energize the specimen turning motor 48 in order to recount a particular specimen at a different scan orientation as will be hereinafter described in more detail.

Vidicon tube television cameras 21' are customarily provided with self-contained means 21'' for generating standardized televion horizontal and vertical sweep frequencies. While such means 21'' are retained in the camera 21' of the present invention for activation under certain specialized circumstances to be described, the sweep frequencies for object counting are controlled by a clock pulse source 88 which also provides timing pulses for the data processing circuits that analyze the video signal output of the tube 21. The position of objects detected in the course of the scanning may thus be identified and temporarily stored by digital circuits having counters which receive the timing pulses produced during each scan. The effective horizontal and vertical sweep frequencies for object counting operations are made substantially lower than the normal television sweep frequencies and typically have values of 10 $KH_z$ and 10 $H_z$ respectively. This is a very significant factor in realizing the objective of providing a compact and economical counting system in that inexpensive low frequency circuit elements may be used in the data processing components of the apparatus.

In this example of the apparatus, using the above identified sweep frequencies, 1,000 horizontal scans of each specimen are made and synchronized clock pulses are provided to separate each scan into 1,000 time units for object location purposes. Accordingly, clock pulse source 88 is driven by an oscillator 89 operating at a frequency of 10 megahertz and having an output which is passed through a control gate 90 and then sequentially through six decade dividers 91a to 91f respectively. Each of dividers 91a to 91c have four timing pulse outputs which are indicated in FIG. 4A by the letter P followed by the BCD (binary coded decimal) value of the output. Thus divider 91a has outputs P1, P2, P4 and P8 while divider 91 has outputs P10, P20, P40, P80 and divider 91c has outputs P100, P200, P400 and P800. Each of the dividers 91d, 91e and 91f have two outputs designated in FIG. 4A by the letter W followed by the binary coded decimal value of the output. Thus divider 91d has outputs W1 and W8 while divider 91e has outputs W10 and W80 and divider 91f has outputs W100 and W800. Output PO transmits the 10 megahertz frequency of oscillator 89. By decoding techniques known to those skilled in the art, a timing signal may be derived by combining outputs of this form to mark any time unit in the range from 1 to 1,000,000 wherein each time unit corresponds to one cycle of oscillator 89. Thus an AND gate 92a may have six inputs connected respectively to divider outputs P1, P8, P10, P80, P100 and P800 to produce an output signal at time 999 in each scan which output signal (P time 999) indicates the end of each scan. Similarly, another AND gate 92b has six inputs respectively connected to divider outputs W1, W8, W10, W80, W100 and W800 to produce an output signal at time 999,000 (W time 999) marking the start of the final scan in the frame. As hereinafter described in more detail, this W time 999 signal is used as an end of frame signal. This is suitable for this purpose, although the final scan has not been completed, since data from the final scan is not used as previously described. To avoid excessive complication in the drawings, the other time decoding circuits for various components which require a timing signal of some particular value are shown in the drawings in block form, suitable detailed circuitry being known to those skilled in the art.

To determine the horizontal sweep frequency of vidicon tube 21, an AND gate 93a has three inputs coupled respectively to divider outputs P1, P10 and P100 to transmit a signal at the start of each scan to a single-shot multivibrator 94 of a horizontal sweep circuit 95. Multivibrator 94, which has a period of 6 microseconds in this instance, shapes the timing pulse signal to match the requirements of vidicon tube 21 and thus functions essentially as a buffer. The output pulses from multivibrator 94 are transmitted through a DC level restorer 96 to the horizontal sync signal terminal of camera 21. Similarly, an AND gate 93b has three inputs coupled respectively to divider outputs W1, W10 and W100 to produce an output signal at the start of each frame of scanning the output signal being transmitted to the vertical sync signal terminal of camera 21 through a single-shot multivibrator 97 and DC level restorer 98 of vertical circuit 95', the multivibrator 97 having a period of 600 microseconds in this instance. Thus, the vidicon tube 21 is caused to scan petri dish 32 in 0.1 seconds in a raster pattern which includes 1,000 substantially parallel successive scan lines while timing pulses synchronized with the scanning action are available wherein each such signal horizontal scan line is identifiable as composed of 1,000 discrete increments.

Vidicon tube 21 includes the conventional video signal output conductor 99 that transmits a signal which varies in magnitude as a function of the light intensity at each successive scanned increment of petri dish 32. Thus, the video signal on conductor 99 undergoes transitions from a first level to a lower level as the scan passes from the relatively light background to a darker area defined by an object such as a bacteria colony on the petri dish and undergoes a reverse transition as the scan passes from the dark object back onto the light background. The output of vidicon tube 21 is essentially an analog signal and must be digitized, shaped and analyzed to reject unwanted content before processing by digital means which recognizes and counts an object. FIG. 4B illustrates circuit components by which the video signal on conductor 99 is processed for these purposes before being transmitted to a counting circuit input conductor 101. The video signal is transmitted first to a DC standardizing circuit 102 which may be a saturated amplifier that both amplifies the signal and establishes a predetermined constant base level. The output of standardizing circuit 102 is branched to pass through a selected one of two Schmidt trigger circuits 103A and 103B according to the position of the previously described light and dark signal selector switch 73.

The Schmidt trigger circuit 103A or 103B responds to the previously described level transitions in the video signal by producing well defined pulses having a duration corresponding to the time interval between a first transition in the video signal and the subsequent reverse transition. Schmidt trigger 103A processes dark signals wherein the detected object is darker than the background while Schmidt trigger 103B performs the same function where the objects being selected are lighter than the background but inverts the signal so that positive pulses are delivered to the switch 73 regardless of whether the objects being detected are lighter or darker than the background. The position of switch 73 thus determines whether light objects or dark objects in the specimen are to be counted.

The output pulses from Schmidt triggers 103 are transmitted from switch 73 to a sensitivity selector circuit 106. Sensitivity selector 106 is a digital filter which functions to supress pulses which have less than a preselected duration and thus in effect determines the minimum sized object which is to be counted. To enable the operator to select the minimum object size, the previously described sensitivity selector switch 72 has a plurality of positions, four in this instance, connecting to any of a like number of outputs of the sensitivity selector circuit 106. Each such output transmits only those pulses having a duration exceeding a predetermined value which is progressively greater for each of the several outputs.

Accuracy of object counting in apparatus of this general form may be adversely affected by the signals which originate at the beginning and end of each frame and at the beginning and end of each scan. This is due in part to the irregularities in bacteria colony growth which are likely to be present at the edge of a petri dish, to the fact that colonies at the edge of the dish may have only one detectable boundary and to well known noise problems in a television camera tube at the extremities of each scan. To reduce signal distortions and inaccurate counts from these factors, means are provided for rejecting data occurring during the first several scans of a frame and during the last several scans and for rejecting signals which occur at either extremity of a scan. Considering now suitable circuits for such purpose, pulses which have sufficient duration to be transmitted through sensitivity selector 106 at the selected position of switch 72 are transmitted to one input of an AND gate 107. The other input of AND gate 107 is coupled to a begin frame inhibit circuit 108. Circuit 108 is a timing pulse decoder which transmits an enabling signal to the other input of gate 107 only after a predetermined number of initial scans, typically the first 10 scans, have occurred in each frame. Following the predetermined numbers of initial scans, the begin frame inhibit circuit 108 conditions gate 107 to pass object position pulses from switch 72 to one input of another AND gate 109. The other input to gate 109 is controlled by an end frame inhibit circuit 111 which also decodes timing pulses to disable gate 109 after all but the last several scans, typically the last 10 scans, of a frame have been completed. Thus, the combined effect of gates 107 and 109 is to reject signals which occur in the first several scans or the last several scans of a frame.

Additional AND gates 112 and 113 perform a similar function in rejecting signals which occur at the beginning and end of each individual scan within a frame. For this purpose the output signals from gate 109 are brought to one input of gate 112 while the other input of gate 112 is controlled by a begin scan inhibit circuit 114. Begin scan inhibit circuit 114 decodes timing pulses during each scan to disable gate 112 for a predetermined brief period at the beginning of each scan typically for an initial period of about 10 microseconds in this example. Object position signals which are passed through gate 112 go to one input of gate 113 which has another input controlled by an end scan inhibit circuit 116 which disables the gate 113 during the final ten microseconds of each scan in this example.

The field of view examined by vidicon tube 21 is substantially rectangular whereas the petri dishes on which bacteria colonies are counted are generally circular and thus there are sizeable additional periods in which the output signals of the vidicon tube should be rejected in that such signals are obviously spurious or else represent objects which are not within the area of interest of the petri dish. The above described inhibit circuits for suppressing signals from the beginning and endings of each frame and each scan define an essentially rectangular area of acceptable signals and thus cannot perform the function of rejecting all signals originating from objects or occurrences outside the circular area of interest. The previously described mask performs this function to some extent by physically covering all areas viewed by the vidicon tube other than the circular area of interest on the petri dish but does not by itself provide for maximum accuracy of the object count. Such a physical mask does not avoid counts from spurious signals which may arise from electronic causes during the periods that areas outside the dish are being scanned. Accordingly, the invention provides for defining the circular area in which objects are to be counted by electronic means as well as by physical means whereby any position signals that are produced during the periods that the mask itself is being scanned are rejected. The invention accomplishes this result very simply and with a minimum of circuit complications by using the previously described mask as a means for controlling the action of electronic signal suppression means.

Signal suppression for this purpose is effected in part by an additional AND gate 117 which receives the output of gate 113 and which has another input controlled by an entering data area detector circuit 118, the output of gate 117 being the previously described input conductor 101 to the object counting circuitry. Thus, object position signals are transmitted to conductor 101 when gate 117 is enabled by the data area detector circuit 118. Detector circuit 118 is a Schmidt trigger having an input connected to the previously described switch 73. When each scan first passes from the mask to the area of interest the transition produces a pronounced level change in the video signal. This transition signal triggers circuit 118 whereby gate 117 is enabled during each scan only after the scan leaves the area of the mask and encounters the contrasting background within the central opening of the mask. It should be noted that this transition signal which results in enabling of gate 117 is obtained from a point in the object position signal transmission path which precedes the sensitivity selector 106 and the begin and end of frame and begin and end of scan inhibit gates 107, 109, 112 and 113 respectively. Thus, gate 117 is enabled to transmit signals to conductor 101 as soon as the scan passes off the mask and into the petri dish and without regard to the minimum size signal to be processed or the position in the frame of the scan at the time such signal occurs.

The above described circuit components 117 and 118 result in the rejection of signals which originate prior to the time any particular scan reaches the circular area of interest. Gate 117 cannot function to suppress signals which originate after the scan has left the circular area of interest since it cannot be known until completion of the scan whether or not a subsequent transition signal represents the encountering of an object to be counted or the encountering of the mask at the far end of the scan. This information can only be ascertained at the completion of the scan. If the subsequent transition signal has not been followed by still another reverse transition signal by the end of the scan, then the subsequent transition signal was indicative of the mask and not an object to be counted. The invention provides means for clearing the false count arising from the mask at the completion of each scan to effectively define the far edge of the area of interest for each scan. Such means will be hereinafter described inasmuch as it necessarily operates in conjunction with the object counting circuitry.

Thus, conductor 101 receives pulse signals each indicative of time required for movement of the scan between adjacent transitions between light and dark areas along each scan line, provided that the signals do not originate during the first several scans or the last several scans of the frame and do not originate during the first or final portions of an individual scan and further provided that the signals originate only after each scan has entered the circular area of interest. Such signals will be hereinafter referred to as the processed detector signals. The previously described plug connector 56 is coupled to conductor 101 so that such signals may be transmitted to a general-purpose computer in situations which require a more complex analysis of object parameters than is provided by the present system. As positional data may be needed for this purpose, timing pulses from dividers 91 are also brought out to connector 56.

FIG. 4C illustrates circuits for analyzing the signals on conductor 101 to obtain a count of the objects represented thereby including circuits for recognizing and separately counting objects which may overlap. To facilitate an understanding of the operation of the system as a whole, certain of the complex signal storing and analyzing circuits which are activated by depression of Read Switch 67 are shown in block form in FIG. 4C and will be first described largely in terms of the operations which are performed. A more detailed description of these circuits, which are enclosed by dashed line 5 in FIG. 4C, is hereinafter provided following the description of the whole system.

Scanning of a specimen to obtain an object count is initiated by a depression of the previously described manual Read switch 67 which causes an enabling signal to be transmitted to one input of an AND gate 119, the processed detector signal conductor 101 being the other input to the gate. To generate the enabling signal for gate 119, closing of the Read switch 67 sets a cycle control flip-flop 121 through an OR gate 122. Cycle control flip-flop 121 is a bi-stable multivibrator of the form having a set input and a reset input and an output which is energized in the set condition, suitable detailed constructions for such flip-flop circuits being well understood within the art. The output of cycle control 121 which is energized by receipt of a set signal is connected to the gate 119 to provide the enabling signal thereto and is also connected to a master reset 123 which is a singleshot (monostable multivibrator) that transmits a reset pulse to certain components within the system, to begin scanning of a specimen, as will hereinafter be described. The output of cycle control 121 is also connected to the previously described gate 90 of FIG. 4A by a conductor 124 so that depression of Read switch 67 also enables gate 90 whereby the output of oscillator 89 is transmitted to dividers 91.

Referring again to FIG. 4C, processed detector signals which pass through the enabled gate 119 are transmitted to a free-counter selector circuit 128 which activates a centerlocate counter circuit 129. Centerlocate counter circuit 129 includes a plurality of counters substantially exceeding the maximum number of objects which might be encountered in the course of a single scan, 24 counters being provided in one existing example of the invention. Each of the individual counters within circuit 129 receives the timing pulses which accompany each scan and stores the accumulated count as the scan progresses until the leading edge of a processed detector signal is received at free-counter selector 128. At that time, free-counter selector 128 causes a selected one of the individual counters of circuit 129 to continue counting timing pulses at one-half the normal rate until such time as the trailing edge of the processed detector signal is received. The trailing edge of the processed detector signal stops the half-rate count at the selected counter of circuit 129 thereby storing a count identifying the position of the centerline of the object which caused the processed detector signal. To identify the trailing edge of the processed detector signal, the output of gate 119 is transmitted to center-locate counter circuit 129 through an inverter 131 and conductor 132. The inverter 131 causes a signal to appear on conductor 132 when the processed detector signal at the output gate 119 terminates.

Should another processed detector signal pass through gate 119 in the course of the same scan, free-counter selector 128 activates another of the individual counters of circuit 129 to store the new centerline identifying count in a similar manner and this action may be repeated for still other processed detector signals in the course of the same scan. Thus, at completion of the scan, counter circuit 129 has stored data indicative of the centerlines of all objects first encountered in the course of that scan. All counters of circuit 129 which have not stored centerline data reach the maximum count and reset at that time.

During the next scan, objects which resulted in the storage of a centerline count in circuit 129 may be reencountered and may produce another processed detector signal at the output of gate 119 (normally many successive scans will cross each object). It is necessary that the system recognize that such detector signals do not indicate a new object to be recorded in the total object count. Considering now the means by which this is accomplished, a comparator circuit 133 has a plurality of comparators each coupled to an associated individual one of the counters of circuit 129. Each such comparator constantly compares the count in the associated counter with the instantaneous count from the clock pulse source during each scan and generates an equals signal if a coincidence occurs. (The counters are preset to a count of minus one so that such equals signals do not occur continuously but occur only in the course of subsequent scans following stopping of a counter to store an object centerline count.) If an equals signal is produced while a centerline count is being stored in a particular one of the counters of circuit 129 as previously described, a repeat detector circuit 134 acts to reset that particular counter at the end of the scan thereby eliminating the duplicative data.

Thus, the repetitive object position data is cleared from the storage. This process is repeated during each subsequent scan in which the same object is encountered. In effect, position data for an object is erased and disregarded after it is determined that some portion of the object underlies an object centerline which is already stored at that time as this condition is interpreted to mean that it is in fact the same object which is being detected. It is this action of the system which enables the recognition and separate counting of overlapping objects. Overlapping objects of sufficient size to be traversed by many scans are counted as a single object only in the relatively rare case where the two overlapping objects have identical or very close centerlines such as occurs when one of the two overlapping objects is directly below the other. Object diameter in relation to the separation of successive scans and degree of overlap interact with centerline separation to affect the ability of the system to distinguish separate but overlapping objects. Relatively small objects and extensively overlapping objects are less likely to be recognized as two objects where the centerlines are close together. While the system is unable to distinguish between overlapping objects which have identical or closely adjacent centerlines, the degree of error which is introduced in the final count, has not been found to be unduly significant inasmuch as errors of comparable magnitude occur in conventional counting by a human technician.

After the centerline position of an object has been stored in one of the counters of circuit 129, as described above, and duplicative data from subsequent scans has been eliminated, a scan eventually occurs at which no object is detected at the stored centerline position. This indicates that scanning through the area of that object has now been completed. It is then necessary to clear the stored centerline data from circuit 129, as it is no longer needed, while adding one object count to the total of objects counted. For this purpose, the equal signals from comparator circuit 133 are transmitted to an object end detector circuit 137. Object end detector 137 receives the inverted processed detector signals of conductor 132 which signals indicate the absence of a processed detector signal. After an equals signal is received from circuit 133 concurrently with a signal on conductor 132 (indicating that there is no processed detector signal at that time), the object end detector circuit 137 transmits an add one object count signal to an averaging circuit 138. At the end of the scan, a signal from circuit 137 is also transmitted to free-counter selector circuit 128 and counter circuit 129 to reset the particular counter of circuit 129 which was storing the centerline data for that object thereby freeing the counter to store the centerline data for another object during a subsequent scan.

As will hereinafter be described in more detail, averaging circuit 138 provides for automatic repeated scanning of the same specimen and averaging of the results to enhance accuracy, but for the purpose of the immediate discussion, it should be regarded as simply providing a through signal path to a BCD count accumulator 139. Count accumulator 139 may be of conventional design and transmits the accumulated total object count to a conventional BCD to decimal converter 141. Converter 141 is in turn coupled to the numerical readout 64 which displays the accumulated count visually in decimal numbers. Count accumulator 139 also transmits the totalled object count, in BCD form, to plug connector 58 to which a column printer 142 may be connected to print out the object counts for a sequence of specimens. A signal from averaging circuit 138 which indicates completion of the scanning of a particular specimen is transmitted to the reset input of cycle-control flip-flop 121 to reset the cycle-control and thereby deactivate the system in preparation for a subsequent scanning operation.

Means were previously described by which processed detector signals were blocked from input conductor 101 if the signals originated prior to the time that the scan enters the circular area of interest. To enhance accuracy it is equally desirable that apparent processed detector signals which originate after each scan has left the circular area of interest be prevented from initiating an object count. For this purpose, an AND gate 146 is arranged to function as an end of scan mask signal detector.

In particular, gate 146 has one input connected to conductor 101 and a second input which receives the particular timing pulse, P time 989 which marks the time just prior to termination of the processed detector signal (by end scan inhibit 116) near the end of the scan. Thus gate 146 is enabled if an apparent process detector signal appears on conductor 101 and is not terminated prior to the effective end of the scan. Such a condition indicates that the processed detector signal originated from the mask rather than from an object to be counted. Accordingly, the output of gate 146 is transmitted to free-counter selector circuit 128 and counter circuit 129 to reset the particular counter which is in the process of storing an erroneous object centerline which actually is originating from the mask. The presence of this false processed detector signal, which is erased at the end of the scan, prevents any other erroneous count from being recorded once the scan has left the area of interest and entered the mask.

The column printer 142 is actuated to begin a series of count printouts by depression of the previously described printer start switch 68 which supplies a start signal to the printer through plug connector 58 and which also applies a reset signal to a dish identify counter 147. Counter 147 has an input connected to the output of cycle control flip-flop 121 through an AND gate 148 and has an output connected to the column printer 142 through plug connector 58 whereby a count of the successive operations of the cycle control 121 is applied thereto. AND gate 148 is normally enabled by a connection of the output of a recount control flip-flop 149 to the other input of the gate. Recount control flip-flop 149 is set, to enable gate 148, by the signal from averaging circuit 138 which resets the cycle control flip-flop 121 following each specimen count.

The recount control switch 69 provides a means by which the operator may initiate a recount of a particular specimen without disrupting the sequence of identifying numbers provided by the dish identify counter 147, if he observes an obviously erroneous count at readout 64 indicating that a malfunction has occurred. Depression of the recount control switch 69 resets the recount control flip-flop 149 thereby disabling gate 148 so that dish identify counter 147 does not generate a new specimen count signal for the subsequent cycle of operation. The depression of the recount control switch 69 automatically initiates the subsequent cycle by supplying a set signal to cycle control flip-flop 121 through an input to the previously described OR gate 122.

FIGS. 5A, 5B and 5C illustrate a suitable detailed arrangement of circuit components for the free-counter selector 128, center-locate counters 129, comparators 133, object end detectors 137, repeat detectors 134, and averaging circuit 138 which were shown in block form in FIG. 4C and previously described largely in terms of the operations performed. Referring now to FIGS. 5A, 5B and 5C in conjunction, each of the above-identified circuits, with the exception of the averaging circuit 138, has a series of distinct but essentially similar data channels corresponding to the number of separate object centerline locating counters 151 within the center locate counter circuit 129. As hereinbefore discussed, the number of such counters 151 and thus the number of distinct channels through the circuit of FIGS. 5A, 5B and 5C should exceed the maximum number of objects which may be encountered in the course of a single scan, however, to avoid excessive complication and unnecessary repetition in the drawing, only the components of the first two channels are shown in FIGS. 5A to 5C. The construction and interconnections between the additional channels will be evident from an understanding of the two which are depicted.

Each of the counters 151 of circuit 129 are divide by 1000 counters of the form which are preset to a count of 999 for reasons to be hereinafter discussed. Timing pulses are transmitted to the input of each counter 151 through an associated individual one of a series of OR gates 152 which admit either a 10 MHz frequency from a PO timing pulse conductor 153 or a 5 MHz frequency obtained through a divide by two divider 156 coupled to conductor 153. Which frequency is supplied to gate 152 at any given time is determined by the condition of an associated one of a series of counter control flip-flops 157. Considering now a single channel, flip-flop 157a determines which frequency is transmitted to counter 151a by means of a pair of AND gates 158a and 159a which have outputs each connected to a separate one of the inputs of OR gate 152a. One input of AND gate 158a is connected to the PO timing pulse conductor 153 while the other input of gate 158A is connected to the reset energized output of flip-flop 157a. Thus, when flip-flop 157a is in the reset condition AND gate 158a is enabled and the 10 MHz frequency is transmitted to counter 151a through OR gate 152a. When flip-flop 157a is in the set condition AND gate 158a is disabled and transmission of the 10 MHz frequency to the counter is stopped. AND gate 159a has one input connected to the half rate timing pulse conductor 154, another input connected to the particular output of flip-flop 157a which is energized in the set condition of the flip-flop, and a third input connected to the set energized output of an additional stop counter flip-flop 161a. Thus, when both flip-flops 157a and 161a are in the set condition AND gate 159a is enabled to transmit the 5 MHz frequency timing pulses to the input of counter 151a through OR gate 152a.

Accordingly, with flip-flops 157a and 161a in an initially reset condition at the beginning of the cycle of operation, counter 151a will record a count indicative of the progress of each scan by counting from 0 to 1000 during each scan and then resetting for the subsequent scan. (Due to the preset condition, the actual count is from 999 to 998 i.e., the counters 151 lag the count from clock pulse source 88 by one.) However, if flip-flops 157a and 161a are set at some point in the course of the scan, the counter 151a then continues counting at a half rate.

Free counter selector circuit 128 causes this half rate count to commence upon the appearance of a processed detector signal at the output of gate 119 by setting flip-flops 157a and 161a as will hereinafter be discussed in more detail. Upon the subsequent termination of the processed detector signal, the inverted signal on conductor 132 resets flip-flop 161a thereby disabling gate 159a and stopping counter 151a. Counter 151a then stores the count indicative of the center line of the object which caused the processed detector signal.

Once a particular counter 151 has recorded an object's centerline count in this manner, it is necessary that the count be stored, possibly through many successive scans, until certain conditions are met such as completion of all scans through that particular object or a determination that the same centerline has already been stored in another one of the counters, or a determination that the processed detector signal originated from the mask rather than an object to be counted. Thus, when an additional processed detector signal appears at the output of gate 119, free counter selector circuit 128 must activate tan additional channel wherein the counter 151 is not storing a centerline position at that time.

Considering now the means by which free counter selector circuit 128 activates an available channel of counter circuit 129 each time a new processed detector signal is received, the set inputs of each of the flip-flops 157 an 161 of each channel are connected to the output of an associated one of the series of counter select flip-flops 162 whereby flip-flops 157 and 161 are set when the associated counter select flip-flop 162 is set. Accordingly, setting of a particular counter select flip-flop 162 causes the associated counter 151 to begin a half-rate count. A begin centerline count signal conductor 163 connected to the output of gate 119 through a single shot (monostable) multi vibrator 165 transmits a set signal to the first channel counter select flip-flop 162 through an associated one of a series of AND gates 164 if the associated gate 164a is enabled. An enabling signal is transmitted to the first AND gate 164a by a connection to the reset energized output of the associated first counter select flip-flop 162a. Accordingly, an incoming processed detector signal at gate 119 will set the first counter select flip-flop 162a provided that the flip-flop is in a reset condition at the time the signal arrives. Setting of the first channel counter select flip-flop 162a disables gate 164a so that subsequent processed detector signals will not affect counter 151a until such time as flip-flop 162a is reset.

The control signals to the gates 164 of the other channels, such as gate 164b and 164c, differ from that of the first channel in that the additional gates 164 have one input coupled to conductor 163 and the other input coupled to the output of the counter select flip-flop 162 of the immediately preceding channel. Thus, AND gate 164b has one input coupled to conductor 163 and the other input coupled to the output of flip-flop 162a and this pattern is repeated for all additional channels of the system. Thus, if first counter select flip-flop 162a is at a reset condition indicating that counter 151a is available to store an object centerline, then the input gate 164b of the next channel is disabled as are the input gates 164 of all subsequent channels. When the first counter select flip-flop 162a is set in response to a first processed detector signal, then the input gate 164b of the next channel is enabled so that the second channel may store centerline data from the next processed detector signal. Setting of the second counter select flip-flop 162b in turn enables gate 164c to condition the third channel for processing subsequent centerline data and this action occurs progressively in all channels of the system. Resetting of the counter select flip-flop 162 of any particular channel makes that channel available for subsequent count unless a preceding one of the channels is also available.

Comparator circuit 133 includes a series of comparators 166 each associated with an individual one of the channels of the system and each is connected between a separate one of the counters 151 and a timing pulse signal path 167 which receives the timing pulses accompanying each scan. Throughout each scan comparator 166 compares the count in the associated counter 151 with the count from the clock pulse source. Each comparator 166 produces an equals signal at an output 168 at any time that the count in the associated counter 151 corresponds to the count from the clock pulse source. Such an equals signal is not continually produced when the associated counter 151 is counting at the full rate inasmuch as the counter is preset to a count of 999 and thus is always one count behind the clock pulse source under this condition. An equals signal can occur at the output of one of the comparators 166 only after the associated counter 151 has been stopped in the course of a scan. Under this condition, an equals signal will be produced by the associated comparator 166 during each subsequent scan when the count for that scan reaches a value corresponding to the stored centerline count.

When a particular counter 151 has stored a count indicative of an object centerline and during the subsequent scan another counter 151 is activated as described above to begin storing a centerline count, it is necessary to determine if the count being stored in the second counter is originating from the same object as the count stored in the first counter so that the repetitive count in the second counter may be erased at the end of the scan. Resetting of any counter 151 which has stored a duplicative centerline count is performed by repeat detectors 134.

Each repeat detector 134 has an AND gate 169 having one input connected to the output of the associated counter stop flip-flop 161 so that the gate is enabled only during the period that the associated counter 151 is in the process of storing a centerline count. The other input of each gate 169 is connected to the output of one of a series of OR gates 171. Each OR gate 171 receives the equals signals from all comparators 166 in the circuit other than the comparator of the associated channel. Thus each OR gate has a number of inputs equal to the total number of channels minus one, only three such inputs having been illustrated in the drawing in order to avoid excessive complication. Accordingly, a repeat signal appears rat the output of an AND gate 169 if an equals signal is received from some other channel while the channel of that AND gate is recording a centerline. At the completion of the current scan, the repeat signal resets the associated control flip-flops 162 and 157 of the channel which stored the duplicative centerline count. For this purpose, the repeat signal from gate 169 sets a Hold to End of Scan flip-flop 172 to energize an output thereof connected to one input of an additional AND gate 176 which has another input receiving the P999 timing pulses which are indicative of the end of the scan. Thus, if flip-flop 172a is set in the course of a scan, the repeat signal appears at the output of gate 176a upon completion of the scan. This signal resets flip-flop 172a through a delay singleshot 175a and OR gate 170a and is also transmitted to the reset input of counter control flip-flop 157a through an OR gate 177a and to the reset input of counter select flip-flop 162a through an OR gate 179a. Resetting of counter control flip-flop 157a energizes an output 181a thereof which is connected to the reset input of counter 151a through an AND gate 182a. Gate 182a has another input receiving the timing pulse signal indicative of the start of each scan, through an AND gate 178 having three inputs respectively receiving time signals P1, P10 and P100. Thus resetting of counter 151a only occurs at the start of a scan. The resetting of flip-flop 157a also disables counter input gate 159a and enables input gate 158a whereby the half-rate timing pulses are blocked from the counter 151a and the PO timing pulses are again transmitted thereto. Thus, the repeat reset action restores the channel to the original condition for use in recording a subsequent centerline.

As gate 169a is disabled by resetting of stop counter flip-flop 161a as described above, the repeat reset action can only occur during the scan in which a centerline count is being initially stored. Thereafter the repeat reset circuit for that channel remains disabled and the centerline count is held through subsequent scans until the end of the object is detected as will be described.

Means were previously described which generates a signal at the output of a gate 146 at the end of each scan if a centerline count in the process of being stored is in fact a false count arising from the presence of the mask at the end of the scan. This gate 146 signal resets the particular counter which is storing the false signal. For this purpose a separate AND gate 187 at each channel has one input connected to the output of gate 146 and another input connected to the output of the flip-flop 161 of that particular channel. Thus at the end of a scan, an output signal appears at the AND gate 187 only at the particular channel which is in the process of storing the false count as only the flip-flop 161 of that particular channel is set at that time. At each channel the output signal from gate 187 is transmitted to the reset input of flip-flop 162 through OR gate 179 and to the reset input of flip-flop 157 through OR gate 177 to erase the erroneous count and restore the channel to the original condition.

A third condition which requires clearing of a particular channel occurs when a scan progresses through the centerline position stored in that channel without detecting any object area at that position. This condition indicates that scanning of that particular object has been completed and that an add one object count should be generated and the channel cleared. This operation is performed by the object end detector circuit 137. At each channel circuit 137 includes an AND gate 183 with one input which receives the equals signals from the output 168 of the associated comparator 166 and another input which receives the inverted processed detector signals of conductor 132. Thus a signal appears at the output of an AND gate 183 only if an equals signal is generated in that channel at a time when there is no processed detector signal which condition indicates that scanning of an object has been completed. At each channel an output signal at gate 183 is a tentative add one count and sets an object end detector flip-flop 188 energizing an output thereof which is connected to one input of an additional AND gate 184. This is termed a tentative object count since it is held by flip-flop 188, and is not passed on to the averaging circuit, until the end of object condition is confirmed during the next subsequent scan. This reduces false counts from the outline irregularities which may be present at the margins of bacteria colonies or other objects being counted. To perform this confirmation, the other input of each AND gate 184 is coupled to the output of the associated gate 183 through a delay singleshot 185. Owing to the delay 185, gate 184 is not enabled by the same signal which sets the associated repeat detector flip-flop 188 and the add one object count is not transmitted through gate 184 during that scan. Gate 184 is enabled to transmit the object count only when an end of object signal again appears at the output of gate 183 during a subsequent scan.

To reset the channel after the end of object is confirmed, the output of each gate 184 sets an associated one of a series of flip-flops 190. Each such flip-flop 190 has an output connected to one input of one of a series of AND gates 186. The other input of each AND gate 186 receives the end of scan (P Time 999) timing pulse so that gate 186 transmits an end of object reset signal at the completion of the current scan. The reset signal from gate 186 resets the flip-flop 188 through an OR gate 188' and resets flip-flop 190 through an OR gate 190' and is also transmitted to the reset inputs of flip-flops 162 and 157 through OR gates 179 and 177 respectively to clear the channel.

The add one object counts from all gates 184 are also transmitted to separate inputs of an OR gate 191 of averaging circuit 138 whereby the OR gate receives all add one object counts from every channel. The averaging circuit 138 has an output which transmits object counts to the previously described BCD Accumulator 139 and ultimately to the readout 64 and column printer 142 of FIG. 4C. Referring again to FIG. 5C, the averaging circuit 138 includes the previously described counts averaging switch 71 which may be set by the operator at any of four positions. At a first position of the switch 71, all add one object counts from OR gate 191 are simply transmitted through the averaging circuit to the output conductor 192. At a second position of switch 71 the add one object counts are transmitted to output 192 through a divide by two counter 193 while a recycle means 194, to be hereinafter described, automatically initiates an additional frame of scanning of the same specimen. Thus with the switch 71 at the second setting one output count is transmitted to the accumulator for each two counts from OR gate 191 but the specimen is scanned twice so that a correct count is transmitted. The effect of this double scanning and dividing by two is to average the data from the two cycles and thereby to increase accuracy in the event that one of the frames of scanning was in error due to some malfunction. At the second setting of counts averaging switch 71, add one object counts from OR gate 191 are passed through the divider 193 and through an additional divide by two divider 196 before being transmitted to output conductor 192, with the recycling means 194 providing for four frames of scanning of the same specimen. At the fourth setting of switch 71, the add one object counts pass through dividers 193, 196 and an additional divide by two divider 197 while recycling means 194 provides for eight frames of scanning of the same specimen. Thus the several positions of the counts averaging switch 71 provide for progressively greater accuracy by averaging the results of progressively larger numbers of frames of scanning of the same specimen.

At any position of the switch 71, each count appearing at the output 192 resets all of the dividers 193, 196 and 197 through a single shot multi-vibrator 198 which provides a small time delay in order to enable the count to be recorded in the accumulator before resetting of the dividers.

Recycling means 194 has a four position switch 71' with a swinger which is ganged to switch 71 for simultaneous operation therewith and which is connected to the reset inputs of the cycle control 121 of FIG. 4C and the set input of Recount Control 149. Referring again to FIG. 5C, recycling means 194 has an input which receives the timing pulse (W time 999) which marks the end of each frame of scanning and at a first position of the switch 71', the end of frame timing pulse is simply transmitted directly through switch 71' to reset the cycle control 121 and thereby stop scanning until such time as the operator again depresses the Read switch. At the second position of switch 71' the end of frame timing pulses are transmitted to switch output 199 through a divide by two divider 201. Thus at the second position of switch 71' the cycle control 121 is not reset until two frames of scanning of the same specimen have occurred. At the third position of switch 71' the end of frame time pulse is passed through divider 201 and an additional divide by two divider 203 before being transmitted to the cycle control reset and at the fourth position of switch 71' the end of frame timing pulses pass through dividers 201 and 203 and an additional divide by two divider 204 so that the system is automatically recycled four times or eight times respectively. Each reset pulse on conductor 199 also resets each of the dividers 201, 203, and 204 through a single shot milti-vibrator delay circuit 206.

The previously described master reset pulse source 123 connects to the reset inputs of dividers 201, 203, 204 and 206 through a diode 211 and to dividers 193, 196, 197 and 198 through an additional diode 212. The diodes 211 and 212 prevent the internal reset signals of the averaging circuit from feeding back into the master reset system. Master reset pulses are also transmitted to OR gates 177 and 179 of FIG. 5A, to OR gates 170 of FIG. 5B and to OR gates 188' and 190' of FIG. 4C to assure that the bistable components of each channel are at a reset condition following depression of the Read switch.

Referring now again to FIG. 4A, there are circumstances in which it is helpful if the operator can view a specimen which is positioned for counting without removing the specimen from the apparatus. For this purpose a standard television receiver set 207 may be coupled to the video signal output conductor 99 of camera 21 through plug connector 57. To produce the specimen image on the screen of television receiver 207, it is necessary that the standard horizontal and vertical sweep frequencies of camera 21 be temporarily restored. For this purpose, the reduced sweep frequencies generated by circuits 95 and 95' are transmitted to the camera 21 through a pair of two position switches 208 and 209 respectively. Depression of the previously described TV monitor control 75 shifts both switches 208 and 209 to the alternate position at which the sync signal terminals of the camera 21' are coupled to the internal standard sweep frequency generator 211 of the camera. Depression of monitor control switch 75 thus temporarily reestablishes standard sweep frequencies to produce a meaningful image of the specimen on receiver 207.

While the invention has been described with respect to a preferred embodiment, it will be apparent that many variations are possible within the scope of the invention and it is not intended to limit the invention except as defined in the following claims.

What is claimed is:

1. In apparatus for detecting and counting optically distinguishable objects in a predetermined area , the combination comprising:

a television camera having means for scanning said area along successive parallel lines extending thereacross and having means producing output signals indicative of transitions between relatively light and dark regions along said scan lines which transitions demark the boundaries of said objects, oscillator driven means coupled to said camera tube for establishing horizontal and vertical sweep frequencies therein which are substantially lower than the standard broadcast television sweep frequencies employed in such tubes and having means providing a source of clock pulses synchronized with said reduced frequency scanning of said tube whereby a predetermined number of clock pulses occur during each scan enabling the position of an object along a scan line to be identified by the number of clock pulses which have occurred as the object is detected, wherein said oscillator driven means and clock pulse source further comprises a plurality of series connected dividers receiving the output of said oscillator and having a plurality of timing signal outputs each transmitting a frequency which is a predetermined submultiple of the output frequency of said oscillator, first timing signal decoding means connected between said clock pulse source and said television camera for controlling said horizontal sweep of said tube, and a second timing signal decoding means connected between said clock pulse source and said tube for controlling said vertical sweep of said camera, object count accumulator means for storing the total count of objects detected in the course of said scanning of said area, pulse counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, and repeat detector means coupled to said counting circuit means for comparing the positions of objects detected in a particular scan line with the positions of objects detected in a preceding scan line and for preventing registering of an additional object count by said object count accumulator means when an object position is substantially similar to an object position in said preceding scan line.

2. In apparatus for detecting and counting optically distinguishable objects in a predetermined area, the combination comprising:

a television camera having means for scanning said area along successive parallel lines extending thereacross and having means producing output signals indicative of transitions between relatively light and dark regions along said scan lines which transitions demark the boundaries of said objects, oscillator driven means coupled to said camera tube for establishing horizontal and vertical sweep frequencies therein which are substantially lower than the standard broadcast television sweep frequencies employed in such tubes and having means providing a source of clock pulses synchronized with said reduced frequency scanning of said tube whereby a predetermined number of clock pulses occur during each scan enabling the position of an object along a scan line to be identified by the number of clock pulses which have occurred as the object is detected, object count accumulator means for storing the total count of objects detected in the course of said scanning of said area, pulse counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, repeat detector means coupled to said counting circuit means for comparing the positions of objects detected in a particular scan line with the positions of objects detected in a preceding scan line and for preventing registering of an additional object count by said object count accumulator means when an object position is substantially similar to an object position in said preceding scan line, and a plurality of signal inhibitor gates forming a portion of the transition signal path between said television camera and said pulse counting circuit means, said inhibitor gates being coupled to said source of clock pulses and being disabled by clock pulse counts which identify an initial and final portion of each scan and an initial and final portion of each frame.

3. In apparatus for detecting and counting optically distinguishable objects in a predetermined area, the combination comprising:

an electronic scanning tube having means for scanning said area along successive parallel lines extending thereacross and having means producing output signals indicative of transitions between relatively light and dark regions along said scan lines which transitions demark the boundaries of said objects, a source of clock pulses synchronized with said scanning of said tube whereby a predetermined number of clock pulses occur during each scan enabling the position of an object along a scan line to be identified by the number of clock pulses which have occurred as the object is detected, object count accumulator means for storing the total count of objects detected in the course of said scanning of said area, digital counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, said digital counting circuit having a plurality of individual digital counters for storing clock pulse counts indicative of the positions of a plurality of said objects and having means continuously providing for storage of said object position counts in individual ones of said counters throughout at least the central periods of a plurality of said scans, repeat detector means coupled to said counting circuit means for comparing the positions of objects detected in a particular scan line with the positions of objects detected in a preceding scan line and for preventing registering of an additional object count by said object count accumulator means when an object position is substantially similar to an object position in said preceding scan line, cycle control means which may be set to initiate a frame of scanning of said predetermined area by said apparatus, an averaging circuit means for dividing said object counts by a predetermined factor, and recycling means for maintaining said cycle control means in a set condition to effect a number of frames of scanning of said area equal to said predetermined factor.

4. In apparatus for detecting and counting optically distinguishable objects in a predetermined area, the combination comprising:

an electronic scanning tube having means for scanning said area along successive parallel lines extending thereacross and having means producing output signals indicative of transitions between relatively light and dark regions along said scan lines which transitions demark the boundaries of said objects, a source of clock pulses synchronized with said scanning of said tube whereby a predetermined number of clock pulses occur during each scan enabling the position of an object along a scan line to be identified by the number of clock pulses which have occurred as the object is detected, object count accumulator means for storing the total count of objects detected in the course of said scanning of said area, digital counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, wherein said digital counting circuit means has a plurality of clock pulse counters for storing center line position counts for a plurality of said objects each of said clock pulse counters being activated by a first of said transition signals from said scanning tube to count clock pulses at one half the normal rate until the subsequent reverse transition signal occurs whereby said counter stores a pulse count indicative of the position of the center line of the object which caused said transition signals, said combination further comprising:

end of object reset means for clearing said stored object centerline data from each of said pulse counters following a subsequent scan in which no object is detected at said center line position stored therein, a free counter selector means for activating a different one of said plurality of counters to respond to each new pair of said transition signals encountered in the course of a scan, and repeat detector means coupled to said counting circuit means for comparing the positions of objects detected in a particular scan line with the positions of object centerlines detected in a preceding scan line and for preventing registering of an additional object count by said object count accumulator means when an object position includes a stored object centerline position from said preceding scan line.

5. In apparatus for detecting and counting optically distinguishable objects in a predetermined area, the combination comprising:

an electronic scanning tube having means for scanning said area along successive parallel lines extending thereacross and having means producing output signals indicative of transitions between relatively light and dark regions along said scan lines which transitions demark the boundaries of said objects, a source of clock pulses synchronized with said scanning of said tube whereby a predetermined number of clock pulses occur during each scan enabling the position of an object along a scan line to be identified by the number of clock pulses which have occurred as the object is detected, object count accumulator means for storing the total count of objects detected in the course of said scanning of said area, digital counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, said digital counting circuit having a plurality of individual digital counters for storing clock pulse counts indicative of the positions of a plurality of said objects and having means continuously providing for storage of said object position counts in individual ones of said counters throughout at least the central periods of a plurality of said scans, repeat detector means coupled to said counting circuit means for comparing the positions of objects detected in a particular scan line with the positions of objects detected in a preceding scan line and for preventing registering of an additional object count by said object count accumulator means when an object position is substantially similar to an object position in said preceding scan line, and motor means for producing relative rotation between said scanning tube and said predetermined area whereby said predetermined area may be rescanned at a different angular orientation to obtain at least a second total count of objects in said area.

6. In apparatus for detecting and counting optically distinguishable objects in a predetermined area, the combination comprising:

an electronic scanning tube having means for scanning said area along successive parallel lines extending thereacross and having means producing output signals indicative of transitions between relatively light and dark regions along said scan lines which transitions demark the boundaries of said objects, wherein the scanning raster of said tube includes areas additional to said predetermined area, a source of clock pulses synchronized with said scanning of said tube whereby a predetermined number of clock pulses occur during each scan enabling the position of an object along a scan line to be identified by the number of clock pulses which have occurred as the object is detected, object count accumulator means for storing the total count of objects detected in the course of said scanning of said area, pulse counting circuit means coupled to said tube to receive said transition signals and coupled to said clock pulse source and to said count accumulator means for storing counts of said clock pulses which are indicative of the positions of objects along a scan line and for delivering object counts representing said objects to said object count accumulator means, repeat detector means coupled to said counting circuit means for comparing the positions of objects detected in a particular scan line with the positions of objects detected in a preceding scan line and for preventing registering of an additional object count by said object count accumulator means when an object position is substantially similar to an object position in said preceding scan line, a mask disposed in the optical path between said tube and said predetermined area and having an opening defining the boundary of said predetermined area, said mask having a surface which optically contrasts with said predetermined area whereby said scanning tube output signal shifts from a first to a second level as each scan leaves said mask and enters said predetermined area, a signal inhibitor gate in the signal transmission path from said scanning tube to said counting circuit means, and means for disabling said signal inhibitor gate while said scanning tube output signal is at said first level.

7. The combination defined in claim 6 further comprising end of scan mask signal detector means having reset means for clearing the count which is in the process of being stored in said counting circuit as each scan is completed.

8. Apparatus for counting visually distinct objects in a predetermined area comprising:

scanning means for scanning successive points in said area along a plurality of substantially parallel scan lines, said scanning means being of the form which produces an output signal that varies as a function of light intensity received from successive points along each scan line and which undergoes a first transition as the scan encounters one of said objects and undergoes a reverse transition as said scan leaves said object, a timing signal source for controlling the horizontal and vertical sweep frequencies of said scanning means and for producing a sequence of timing signals synchronized with each scan across the area and which are repeated during scanning along each of said scan lines, a counting circuit having a plurality of separate counters each having a timing signal input and a reset means, a plurality of gate means each being coupled between said timing signal source and said input of a separate one of said counters for providing said timing signals thereto, each of said gate means having a primary timing signal path for transmitting said timing signals to the associated counter and having a half rate timing signal path including dividing means for providing timing signals to said associated counter at one half the rate that said timing signals are provided through said primary path, free counter selector means for responding to said first transitions of said scanning means output by disabling said primary timing signal path to an available one of said counters and enabling said half rate timing signal path thereto, means for disabling said half rate timing signal path to said selected counter in response to the subsequent reverse transition in said scanning means output signal whereby said selected counter stores a count indicative of the centerline of the object which caused said transitions, a plurality of comparators each coupled between said timing signal source and a separate one of said counters and producing an equals signal when the count from said source in the course of a scan equals an object centerline count stored in the associated one of said counters, repeat detector means coupled between said counters and said comparators for resetting any particular counter if an equals signal is generated by the comparator coupled to any other counter while that particular counter is receiving timing signals through said half rate timing signal path, object end detector means coupled between said counters and said comparators and said scanning means output for resetting any particular counter if the comparator associated therewith generates an equals signal at a time when no object is being scanned by said scanning means, and means for storing a count proportional to the number of times any of said counters are reset by said object end detector means in the course of scanning said predetermined area.

9. Apparatus as defined in claim 8 wherein said object end detector means comprises:
   a plurality of first AND gates each having an output and a first input receiving said equals signals from an associated individual one of said comparators and having another input receiving said scanning means output signal through signal inverting means whereby each first gate transmits a tentative object count if an equals signal is received in the absence of a scanning means output signal indicating that scanning through a given object may be completed,
   a plurality of flip-flops each having a set input coupled to said output of an associated individual one of said first gates and producing a flip-flop output signal upon receipt of a signal at said set input,
   a plurality of second AND gates each having an output coupled to said count storing means and having a first input receiving said flip-flop output signal from an associated individual one of said flip-flops and having a second input, and
   a plurality of signal delay means each being connected between said second input of an associated individual one of said second gates and said output of the associated individual one of said first gates whereby said object count is transmitted to said count storing means only when an equals signal is again received in the absence of a scanning means output signal confirming that scanning of said given object has been completed.

10. Apparatus as defined in claim 8 wherein said counters are of the form which reset to a predetermined count which predetermined count is at least one unit less than the count indicated by said timing signals at the beginning of each scan whereby said comparator associated with any particular counter does not produce an equals signal while said particular counter is receiving said timing signals through said primary timing signal path.

11. Apparatus as defined in claim 8 wherein said free counter selector means comprises:
   a plurality of counter select flip-flops of the form having an output and having a set input which causes said output to assume a first condition and having a reset input which causes said output to assume a second condition, said output of each of said flip-flops being coupled to said input gate means of a separate one of said counters to disable said primary signal path and enable said half rate signal path of the associated counter input gate means when said flip-flop output assumes said first condition,
   a transition signal conductor receiving signals indicative of said first transitions in said scanning means output,
   a plurality of input gates each connected between said transition signal conductor and said set input of a separate one of said flip-flops and each having means for receiving an enabling signal,
   means for transmitting an enabling signal to said input gate of a first of said flip-flops when said output thereof is at said second condition,
   means for transmitting an enabling signal to said input gate of each of the other of said flip-flops when said output of a preceding one of said flip-flops is at said first condition thereof, and
   means for resetting each of said flip-flops when the one of said counters associated therewith is reset by said repeat detector means and said object end detector means.

12. Apparatus as defined in claim 8 further comprising means for delaying resetting of each said counters until completion of the scan during which a resetting action is initiated by either of said repeat detector means and said object end detector means.

13. Apparatus as defined in claim 8 further comprising means coupled between said scanning means output and said timing signal source and each of said counters for resetting any particular one of said counters at the end of a scan when said particular counter is receiving said timing signals through said half rate timing signal path at that time.

* * * * *